UNITED STATES PATENT OFFICE.

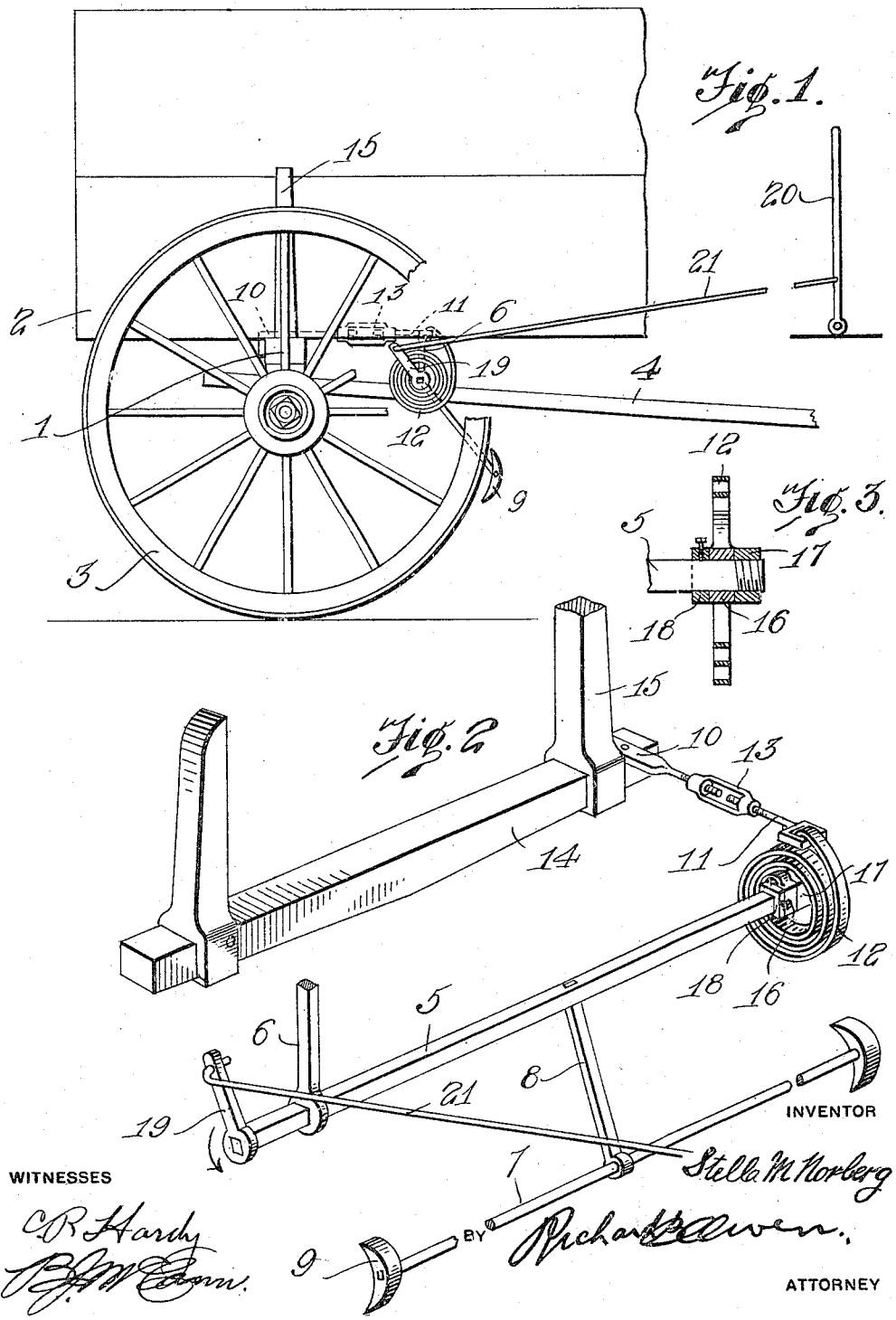

STELLA M. NORBERG, OF PRINGLE, SOUTH DAKOTA.

VEHICLE-BRAKE MECHANISM.

1,229,314. Specification of Letters Patent. Patented June 12, 1917.

Application filed October 19, 1915. Serial No. 56,707.

*To all whom it may concern:*

Be it known that I, STELLA M. NORBERG, a citizen of the United States, residing at Pringle, in the county of Custer and State of South Dakota, have invented certain new and useful Improvements in Vehicle-Brake Mechanism, of which the following is a specification.

My invention relates to wagon brakes and more particularly to an improved brake releasing and supporting means.

My invention has as its primary object the provision of a device of the character above mentioned which is simple in construction cheap to manufacture, strong and durable and effective in operation.

Another object of the invention is to provide a spring releasing means for the brake which serves also as a support therefor.

With the above and other objects in view my invention resides preferably in the construction, combination and arrangement of parts as hereinafter set forth in the specification and illustrated in the accompanying drawings, in which, Figure 1 is a side elevation of a portion of a wagon showing my improved brake applied thereto.

Fig. 2 is a perspective view of my improved brake mechanism showing the same associated with the body bolster of a wagon, and Fig. 3 is a fragmentary sectional view of the construction of the spring support and release.

Similar reference characters designate similar parts throughout the various views of the drawings.

In the drawings, I have illustrated a wagon having the usual body bolster 1, body 2, mounted on the wheels 3, of which there are the usual number. The reach bar is designated 4. My invention comprises a shaft 5 disposed transversely of the body of the vehicle, said shaft being preferably square throughout the greater portion of its length and rotatably supported adjacent one extremity in a bearing bracket 6, said bearing bracket being mounted on the body of the wagon at any convenient point, preferably forward of the rear axle. The shaft 5 serves to support a brake beam 7 through the medium of a hanger 8, said brake beam having the usual brake shoes 9 thereon.

I provide a supporting and releasing means for my invention which includes a supporting rod 10, connecting rod 11 and a spiral spring 12. The adjacent extremities of the rods 10 and 11 are threaded and a turnbuckle 13 of the usual type serves to connect said rods. The rod 10 is rigidly mounted on the body bolster 14 outside of one of the stakes 15.

The inner extremity of the spiral spring 12 is bent to form a squared portion 16 which is engageable over the square shaft 5. The extremity of the shaft 5 adjacent said spring is threaded to receive a nut 17 and a retaining collar 18 is carried on said shaft to prevent movement of the spring longitudinally.

It is to be understood that the spring 12 is of the expansive type, that is, such type of spring which will tend to rotate the shaft 5 in the direction of the arrow, thus tending to maintain the brake shoes 9 away from the peripheries of the wheels. I provide means for applying said brake shoes to the wheels which comprises an arm 19 carried on one free extremity of the shaft 5 having connection with any form of hand lever 20 through the medium of a connecting rod 21. It will be seen that by moving the lever 20 into the forward position the brake shoes 9 will be brought into engagement with the peripheries of their respective wheels against the tension of the spring 12. Upon releasing the lever the spring will return the brake shoes to the released position. It will be noted that the spring 12 not only serves to return the brake shoes to released position but also supports the shaft 5.

From the above description taken in connection with the accompanying drawings it is thought that a clear and comprehensive understanding of the construction, operation and advantages of my invention may be readily gathered, and while I have shown and described the same as embodying a specific structure I desire that it be understood that I may make such changes therein which do not depart from the spirit and scope of the invention as claimed.

I claim:—

1. A vehicle brake, including a shaft, a brake beam hung from said shaft and operable by the rotation of the latter, rigid supporting means at the end of said shaft, yieldable supporting means at the other end of said shaft, and means for rotating the said shaft.

2. A vehicle brake comprising a brake beam having shoes, a supporting shaft adapted to operate the beam, a rigid support for one end of the shaft, a combined adjustable and resilient support for the other end of the shaft, and means for operating the shaft.

3. A vehicle brake, including a shaft, a brake beam hung from said shaft and operable by the rotation of the latter, a rigid support for said shaft adjacent one extremity, operating means for the shaft, a yieldable support on the opposite extremity of said shaft, adjusting means for said yieldable support, said yieldable support both serving to return said brake beam to inoperative position and to support said shaft.

4. A vehicle brake, the combination of the frame, a shaft, a brake beam supported and operable by the rotation of said shaft, a spiral spring for rotating said shaft after an application of the brake to release the brake, the spring having its inner extremity connected with said shaft, an arm supported on the frame, a connection engaging the spring, a turn buckle between the connection and frame support, said turn buckle being adapted to support and form the adjusting element for the spring.

5. A vehicle brake, the combination of a shaft, a rigid support for one end of the shaft, a helical spring having one end connected to the other end of the shaft and forming a yieldable support therefor, means for adjusting the tension of the spring, a support disposed centrally of the shaft, a brake beam capable of flexure mounted on the support, and brake shoes on the ends of the beam.

In testimony whereof I affix my signature in presence of two witnesses.

STELLA M. NORBERG.

Witnesses:
T. W. DELICATE,
C. E. SERVIN.

Copies of this patent may be obtained for five cents each, by addressing the "Commissioner of Patents, Washington, D. C."